June 8, 1965 H. G. LOCKE 3,188,058
MIXING APPARATUS
Filed Nov. 13, 1961 2 Sheets-Sheet 1

Inventor:
Herbert G. Locke
By Kemon, Palmer,
Stewart & Estabrook
Attorneys

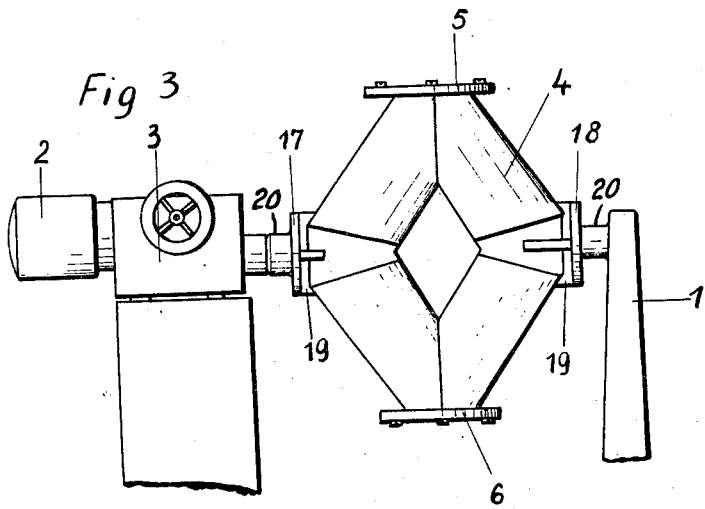
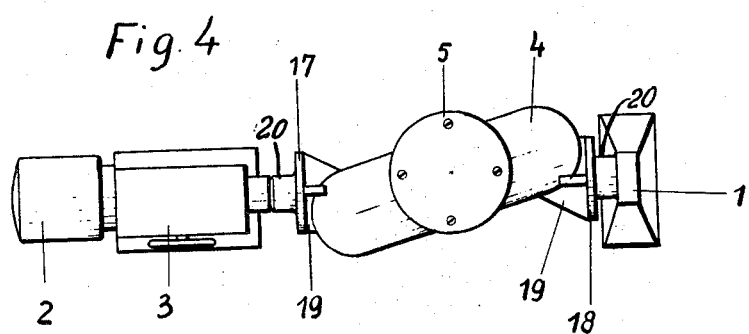

United States Patent Office 3,188,058
Patented June 8, 1965

3,188,058
MIXING APPARATUS
Herbert Gwennep Locke, Selb, Bavaria, Germany, assignor to Gebruder Netzsch Maschinenfabrik, Selb, Bavaria, Germany, a firm
Filed Nov. 13, 1961, Ser. No. 151,995
Claims priority, application Germany, Nov. 18, 1960, N 19,210
6 Claims. (Cl. 259—89)

The invention relates to a rotary mixing apparatus composed of tube lengths for mixing granular or pulverulent masses and especially ceramic masses.

Mixing apparatus are already known in which two tube lengths which receive the material to be mixed, are fitted together in V-shape with the ends of their two arms mounted on a driving shaft. The powders to be mixed are introduced into the two arms provided with covers and the whole apparatus is rotated. In order to obtain good mixing, rods, stirrers or the like are provided in the tube lengths. These rods become particularly apparent when charging the material to be mixed and add to the cost of production. The unbalance caused by the V-shape is also disadvantageous because the mixing apparatus must run at a relatively slow speed in order not to produce any detrimental centrifugal forces. Furthermore, when filling, considerable space must be kept free from mixed material, also on account of the V-shape, if intimate mixing is to be possible at all. Consequently the filling space in relation to the total space available, is only relatively small.

The object of the invention is to improve the known mixers so that the mixing rods, stirrers and the like can be dispensed with and nevertheless thorough mixing of the individual components is possible. Furthermore, the above objections are to be overcome. In order to attain this object, the tube lengths for receiving the materials to be mixed are, according to the invention, fitted together in the form of a parallelogram. By this measure a far greater integral mixing space is produced which considerably assists the mixing. Due to the symmetry of the tube assembly in relation to its axis of rotation, the unbalance can be kept small so that the apparatus will run smoothly even at relatively high speeds.

In order to make the mixing operation more effective, it is proposed according to the invention to mount the tube parallelogram at an incline to the axis of rotation. The inclined position can be adjusted in a simple and advantageous manner by mounting the tube parallelogram so that it is pivotable and can be fixed in a ring which in turn is connected to a driving shaft. Welded-on flanges can also be used instead of the ring.

An embodiment of the invention is illustrated by way of example in the accompanying drawings, in which:

FIGS. 3 and 4 show in side elevation and top plan view respectively a mixer and tube parallelogram of which is mounted between lateral flanges.

Figure 1:
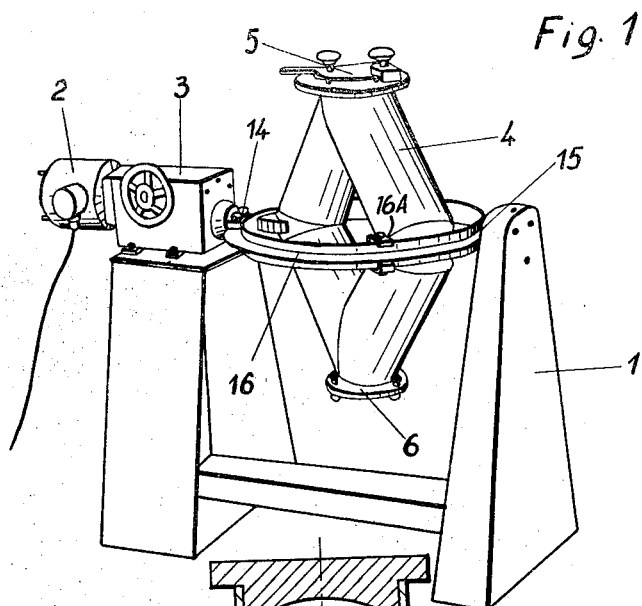
FIG. 1 is perspective view of the mixer, the tube parallelogram of which is mounted in a ring.
Figure 2:
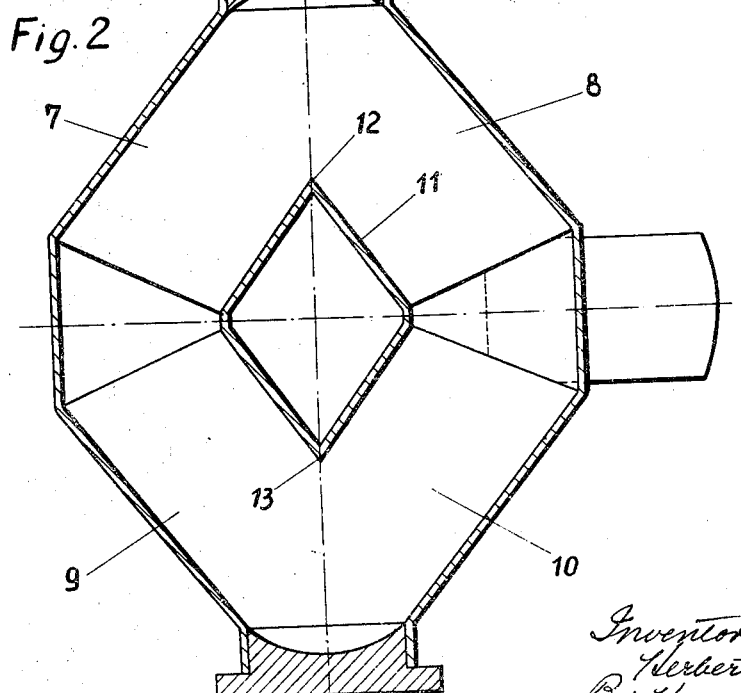
FIG. 2 is a section through the tube assembly of the mixer.

The mixing apparatus comprises a frame 1, a motor 2 with variable transmission gearing 3 and a rotary tube parallelogram 4 for receiving the material to be mixed. The filling aperture of the tube parallelogram is closed by a screwed on cover 5 while the bottom is formed by the flanged bottom plate 6. The tube parallelogram is composed of four tube lengths 7 to 10 fitted and preferably welded together. The centre of the tube parallelogram 4 is formed by a rhombus 11 which has pointed edges 12, 13 within the tube assembly where the tube sections are joined together and forming a kind of cutting edge for the material to be mixed and causing an effective division or separation of the material which considerably accelerates the mixing operation.

The driving shaft 14 projecting from the gearing 3 is connected to a ring 16 rotatably mounted at 15 and in which the tube parallelogram is pivotable and fixable. For example, the paralllelogram may be secured to the ring 16 by a pair of clamps, one of which is shown at 16a in FIGURE 1. Mounting the tube assembly in this manner enables it to be adjusted with its plane in an inclined position with respect to the axis of rotation so that an influence can be exerted on the mixing operation not only by varying the speed of rotation but also by changing the inclination.

The tube parallelogram 4 can be also arranged between lateral flanges 17 and 18 instead of in the ring 16, as shown in FIGS. 3 and 4, whereby FIG. 4 shows the inclined position of the tube parallelogram very clearly. The flanges 17 and 18 are provided with trunnions 20 to enable the tube parallelogram to be rotatably mounted in the frame 1. Ribs 19 are also provided on the flanges for welding to the tube assembly 4.

The charge space is considerably larger than in the case of the V-shaped mixers, so that the same quantities of material can be mixed in a shorter time. The gearing 3 is preferably infinitely variable so that the speed of rotation of the tube parallelogram 4 can be continually regulated.

The apparatus according to the invention can be used for mixing the following materials:

Metal powders, pigments, foodstuffs, grain, fine and coarse chemical powders, pharmaceutic products, ceramic masses, synthetic substances, resins, asbestos, minerals, glass powders, explosives, plant protective agents, gelatins, granular and pulverulent substances of all kinds.

The mixing apparatus, although primarily intended for dry mixing, can also be used with equal advantage for wet mixing in certain cases.

The special constructional feature of the mixer according to the invention is the fixing of the mixing body in inclined position. The result of this is that the material to be mixed carries out a spiral movement at each rotation of the housing, first to the left and then to the right. The material enters the cycle at different times. At each revolution it therefore changes its direction of rotation. The result of this arrangement of the mixing housing is a normal conical mixing in addition to a counter moving spiral movement. The apparatus has no baffle plates or similar devices which impede cleaning and also changing from one material to another. The result of this construction is a very thorough mixing process carried out in a very short period of time.

Where it is a question of retaining the shape of the crystals or the size of grain of the material to be ground or when there is a great difference in the quantities of material or in the specific gravity thereof, in the case of mixed charges, the use of the mixer according to the invention is particularly to be recommended as it is far superior to the V-shaped mixers especially in this case. The mixing operation is effected with a continuous separation or division of the material to be mixed and subsequently reuniting the particles, while at the same time the material is given a spiral movement along the tubes of the parallelogram at an angle inclined to the axis of rotation. This is a simple yet highly effective construction.

The tube parallelogram may be made of steel, stainless steel, Plexiglass or of rubber or enamel lined housings. Another construction provides for lagging the mixing housing so that the temperature can be regulated to enable the mixing to be carried out under a vacuum.

The mixing apparatus constructed in this manner can be used at the same time as drier for pulverulent and granular products.

The normal charging aperture can have a bolted-on or hinged over, depending upon the size of the apparatus. The emptying or discharge aperture is controlled by a quick-acting hand slide valve.

The power requirement for the apparatus, measured according to the quantities mixed and the time required for effecting the mixing, is very small indeed. The driving power must be calculated according to the specific gravity of the material to be mixed.

I claim:

1. Rotary mixing apparatus comprising a tube assembly including four lengths of tube joined together in the shape of a parallelogram providing a continuous and unobstructed passage around said lengths of tube, and means mounting said assembly for rotation on an axis passing through the center of said assembly.

2. Rotary mixing apparatus according to claim 1 wherein the said parallelogram assembly is mounted with its plane at an inclination with respect to the axis of rotation.

3. Rotary mixing apparatus according to claim 1 wherein the junctions between adjacent tube sections provide a pair of pointed edges within said assembly for cutting material within said tube assembly at opposing joints of said assembly.

4. Rotary mixing apparatus according to claim 1 wherein the said tube assembly further comprises a ring member mounted for rotation on said axis coincident with one of its diameters, and means adjustably mounting said tube assembly rigidly within said ring to permit adjustment of the inclination of the plane of said tube assembly with respect to the axis of rotation of said ring member.

5. Rotary mixing appartus according to claim 1 wherein the said tube assembly further comprises a pair of aligned trunnions having lateral flanges and wherein said tube parallelogram is connected to said flange.

6. Rotary mixing apparatus according to claim 5 wherein said tube parallelogram is connected to said flanges with its plane at an inclination with respect to the axis of rotation of said tube assembly.

References Cited by the Examiner

UNITED STATES PATENTS

| 2,514,126 | 7/50 | Fischer | 259—89 |
| 2,576,733 | 11/51 | Vasold | 259—180 |
| 2,901,227 | 8/59 | Russum | 259—81 |

FOREIGN PATENTS

| 939,932 | 1/47 | France. |
| 818,463 | 8/59 | Great Britain. |

WALTER A. SCHEEL, *Primary Examiner.*

LEO QUACKENBUSH, *Examiner.*